(12) United States Patent
Tomaru

(10) Patent No.: US 6,879,766 B2
(45) Date of Patent: Apr. 12, 2005

(54) PHOTONIC CRYSTAL AND PHOTONIC-CRYSTAL WAVEGUIDE

(75) Inventor: Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 10/318,103

(22) Filed: Dec. 13, 2002

(65) Prior Publication Data

US 2003/0174993 A1 Sep. 18, 2003

(30) Foreign Application Priority Data

Mar. 13, 2002 (JP) ........................................ 2002-068164

(51) Int. Cl.⁷ .............................................. G02B 6/10
(52) U.S. Cl. ...................................... 385/129; 385/125
(58) Field of Search ................................. 385/129–132, 385/125

(56) References Cited

U.S. PATENT DOCUMENTS 6,075,915 A * 6/2000 Koops et al. ................ 385/125
2001/0012149 A1 * 8/2001 Lin et al. ..................... 359/344
2002/0009277 A1 * 1/2002 Noda et al. .................. 385/130
2002/0048422 A1 * 4/2002 Cotteverte et al. ............. 385/4
2002/0172456 A1 * 11/2002 Hosomi et al. ................ 385/27
2003/0039023 A1 * 2/2003 Romagnoli et al. .......... 359/326
2003/0142719 A1 * 7/2003 Fan ............................ 372/108

* cited by examiner

Primary Examiner—Juliana K. Kang
(74) Attorney, Agent, or Firm—Antonelli, Terry, Stout & Kraus, LLP

(57) ABSTRACT

The present invention provides a technique of reducing an incident/outgoing loss of a photonic crystal. On each of incident/outgoing sides of a photonic crystal, an antireflection layer made of a photonic crystal is disposed. At the incident side of a photonic crystal 200 having an effective refractive index $n_2$, a photonic crystal 100 having an effective refractive index $n_1$ satisfying the relation of $n_1 < n_2$ is disposed, and the thickness of the photonic crystal 100 is controlled so that reflection components from interfaces 210 and 110 cancel each other out by interference, thereby reducing a total reflection loss on the incident side. The outgoing side is similarly constructed.

13 Claims, 8 Drawing Sheets

PHOTONIC CRYSTAL AND PHOTONIC-CRYSTAL WAVEGUIDE

BACKGROUND OF THE INVENTION

The present invention relates to a photonic crystal and a technique of an optical device having, as a component, a photonic crystal in which a waveguide is formed.

When electromagnetic fields are incident on the interface of two media of different refractive indices, generally, a part of the electromagnetic fields is reflected. It is known that the reflected wave can be reduced by an antireflection coating on the interface.

In the case where an electromagnetic field enters a medium 2 having a refractive index $n_2$ from a medium 0 having a refractive index $n_0$ (in the air or vacuum), the interface between the media 0 and 2 is coated with a medium 1 having a refractive index $n_1$ satisfying the relation of $n_0<n_1<n_2$, and the thickness $h_1$ of the medium 1 is set so as to satisfy the equation of $n_1 h_1=(2m+1)\lambda_0/4$ (where $\lambda_0$ denotes a wavelength in vacuum of the incident electromagnetic field and $m=0, 1, 2, \ldots$). Consequently, a wave reflected by the interface between the media 0 and 1 and a wave reflected by the interface between the media 1 and 2 interfere with each other and, as a result, the reflectance on the incident side becomes $R=(n_0 n_2 - n_1^2)^2/(n_0 n_2 + n_1^2)^2$ (refer to, for example, "Applied Optics II" by Tadao Tsuruta, Baifu-kan, 1990, p116).

The photonic crystal is a medium in which a periodic structure of about a wavelength of an electromagnetic field used is fabricated by a microfabrication technology or the like, and a propagation characteristic of the electromagnetic field depends on the periodic structure. When the electromagnetic field enters the photonic crystal, a part of the electromagnetic field is reflected due to a refractive index difference between the outside and inside of the photonic crystal.

In a manner similar to a normal medium, when the photonic crystal can be antireflection coated, a reflection loss can be reduced. However, there is a case that a normal coating process cannot be performed due to a characteristic structure of the photonic crystal, so that incident light from an optical fiber or the like directly enters a photonic crystal device (refer to, for example, Japanese Patent Application Laid-Open No. 11-218627 and U.S. Pat. No. (USP) 6,075,915, U.S. Pat. No. 6,093,246, U.S. Pat. No. 6,028,693, U.S. Pat. No. 5,907,427, and U.S. Pat. No. 5,751,466).

In a photonic crystal integrated device in which photonic crystal devices are successively disposed (refer to, for example, Japanese Patent Application Laid-Open No. 2000-56146 and U.S. Pat. No. 6,278,105 B1), generally, reflection takes place in a connection part of devices. Since the connection part of integrated devices cannot be antireflection coated in the normal way, it is impossible to prevent the reflection.

SUMMARY OF THE INVENTION

An object of the invention is to provide techniques regarding a photonic crystal medium and a photonic-crystal waveguide in which a reflection loss can be reduced in various cases where the antireflection coating cannot be applied.

To achieve the object, the present invention is based on a new finding such that a reflection loss can be reduced by forming an antireflection layer by using a photonic crystal in place of an antireflection coating.

Since the photonic crystal has a periodic structure of about a wavelength of an electromagnetic field used, the electromagnetic fields interfere with each other in the photonic crystal, and the propagation characteristic of the electromagnetic field is different from that of a base material of the periodic structure. As a method of expressing the propagation characteristic, a diagram which is the plot of an angular frequency $\omega$ with respect to the wave number k of an electromagnetic field is often used.

At the time of defining the refractive index of the photonic crystal by using the diagram, when the electromagnetic field of the angular frequency $\omega$ has a wave number k in the photonic crystal, an effective refractive index "n" of the photonic crystal with respect to the electromagnetic field of the angular frequency $\omega$ is given from an equation $\omega=ck/n$. "c" denotes a velocity of light in vacuum. Since the effective refractive index largely depends on the structure of the photonic crystal, the effective refractive index can be set in a wide range by designing of the structure of the photonic crystal.

When the effective refractive index of the photonic crystal through which the electromagnetic field propagates is $n_2$, by disposing the photonic crystal having the effective reflective index $n_1$ satisfying the relation of $n_0<n_1<n_2$ on the incident side and setting the length $h_1$ so as to satisfy $n_1 h_1=(2m+1)\lambda_0/4$ (where $m=0, 1, 2, \ldots$), the reflectance can be reduced.

Representative configuration examples of the invention will be described hereinbelow.

The present invention provides a photonic crystal medium through which an electromagnetic field propagates, wherein an extra photonic crystal is provided for preventing the electromagnetic field from being reflected.

The invention also provides a photonic crystal waveguide for propagating and guiding an electromagnetic field by using a photonic crystal medium, wherein an area of a photonic crystal whose structure is different from that of the main photonic crystal medium is disposed on an incident side or an outgoing side of the photonic crystal medium, and intensity of an outgoing wave from the photonic crystal medium is set to be higher than that in the case where the area does not exist.

In the above configuration, an effective refractive index of the extra photonic crystal disposed in the area on the incident side or outgoing side is lower than an effective refractive index of the main photonic crystal medium for the electromagnetic field to be guided.

In the above configuration, the photonic crystal medium or the photonic crystal disposed in the area on the incident side or outgoing side of the photonic crystal medium is a one-dimensional, two-dimensional, or three-dimensional photonic crystal.

In the above configuration, the electromagnetic field which propagates through the photonic crystal medium is any one of light, ultraviolet rays, visible light, infrared light, millimeter wave, and microwave.

In the above configuration, the photonic crystal medium includes a line-defect waveguide and has a structure that an empty part is formed or a material with a refractive index lower than that of a material of the waveguide is buried in the empty part in a waveguide portion of the photonic crystal disposed in the area on the incident or outgoing side of the photonic crystal medium.

In the above configuration, the photonic crystal medium includes a point-defect waveguide, and a waveguide portion of the photonic crystal disposed in the area on the incident or outgoing side of the photonic crystal medium is a line-defect waveguide.

In the above configuration, the photonic crystal medium includes a point-defect waveguide and has a structure that an empty part is formed or a material with a refractive index different from that of a material of the waveguide is buried in the empty part in a waveguide portion of the photonic crystal disposed in the area on the incident or outgoing side of the photonic crystal medium.

In the above configuration, the photonic crystal medium has a periodic structure and, in the area on the incident or outgoing side of the electromagnetic field, the period or the size of the structure creating periodicity is different from that of the main photonic crystal medium.

In the above configuration, the photonic crystal medium and the photonic crystal disposed in the area on the incident or outgoing side of the photonic crystal medium are disposed in a container.

Further, the invention provides a photonic crystal waveguide in which two or more kinds of photonic crystals are disposed in series and which propagates and guides an electromagnetic field, wherein another photonic crystal having a structure different from that of the photonic crystals is disposed between the photonic crystal mediums which are adjacent to each other so that intensity of an outgoing wave from the photonic crystals which are disposed in series is higher as compared with the case where the extra photonic crystal is not disposed.

DETAILED DESCRIPTION OF THE PREFERRED EMBODIMENTS

First Embodiment

Figure 1:
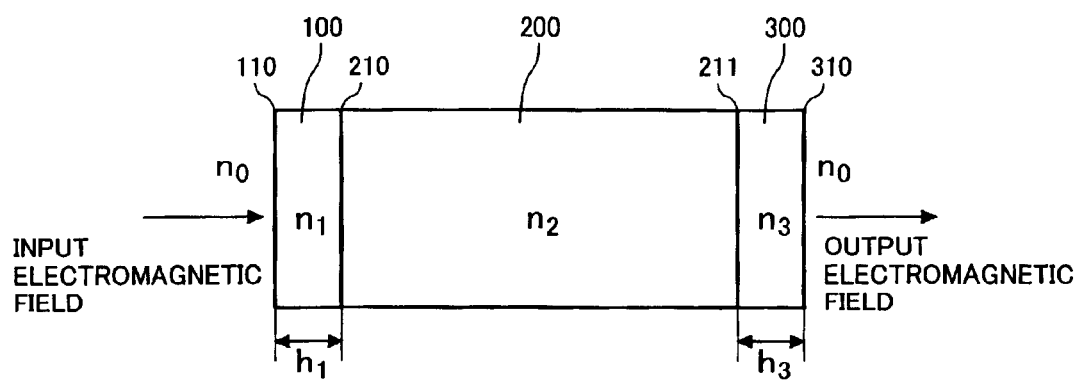
FIG. 1 is a diagram showing a photonic crystal having an antireflection layer of a first embodiment of the invention.
Figure 2:
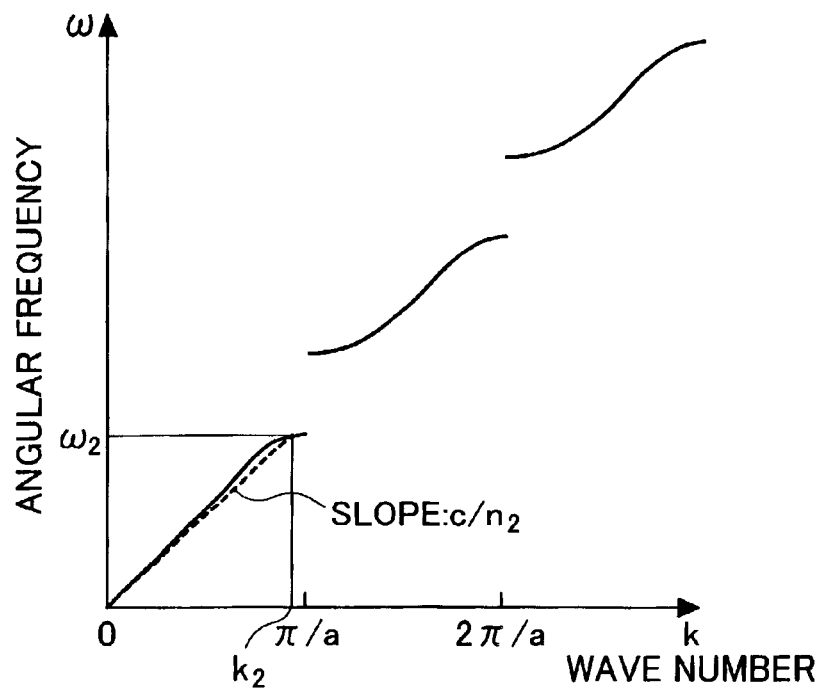
FIG. 2 is a diagram schematically showing characteristics of the photonic crystal.

FIG. 1 is a top view showing a basic configuration of a first embodiment of the invention. FIG. 2 schematically shows propagation characteristics of a photonic crystal 200 transmitting an electromagnetic field.

In FIG. 2, the horizontal axis "k" indicates the wave number, the vertical axis "ω" indicates angular frequency, and "a" denotes the period of a periodic structure of the photonic crystal. A solid line gives the relation between k and ω when the electromagnetic field is in the photonic crystal. The effective refractive index $n_2$ of the photonic crystal with respect to an electromagnetic field of an angular frequency $\omega_2$ is given by an equation $\omega_2 = ck_2/n_2$ using the combination ($k_2, \omega_2$) in FIG. 2, and the slope of a broken line in FIG. 2 indicates $c/n_2$. "c" indicates velocity of light in vacuum. The characteristics of FIG. 2 largely depend on the structure and material consisting of the photonic crystal.

In the case where an electromagnetic field having the angular frequency $\omega_2$ is allowed to enter the photonic crystal 200 having an effective refractive index $n_2$ from a medium 0 (in air or vacuum) having a refractive index $n_0$, a photonic crystal 100 having the structure different from that of the photonic crystal 200 is disposed between the medium 0 and the photonic crystal 200. The structure is set so that the effective refractive index $n_1$ of the photonic crystal 100 satisfies the relation of $n_0 < n_1 < n_2$, and the length $h_1$ is set to satisfy the equation $n_1 h_1 = (2m+1)\lambda_0/4$. $\lambda_0$ denotes the wavelength in vacuum of an electromagnetic field having the angular frequency $\omega_2$. A concrete example of will be described in an embodiment which will be described later.

By disposing the photonic crystal 100, an incident wave is reflected at two interfaces 110 and 210. However, the two reflected waves interfere so as to cancel each other out, so that the total reflectance is decreased as compared with the case where the photonic crystal 100 is not provided.

The outgoing side is similar to the incident side. When the electromagnetic field goes out from the photonic crystal 200 and directly enters the medium 0, then it is considerably reflected. However, by disposing a photonic crystal 300 by designing similar to that on the incident side, reflected waves from interfaces 211 and 310 cancel each other out, so that reflection loss is reduced.

Second Embodiment

As described above as the conventional technique, in the proposals (for example, Japanese Unexamined Patent Application No. 2000-56146 and U.S. Pat. No. 6,278,105 B1) of the integrated photonic crystal device in which a plurality of photonic crystal devices are disposed on a single substrate, reflection losses on the incident and outgoing sides are not considered. Although the propagation characteristics of the devices in the photonic crystal device group integrated on the single substrate are generally different from each other, the issue of reflection at the connection points is not considered at all.

Figure 3:
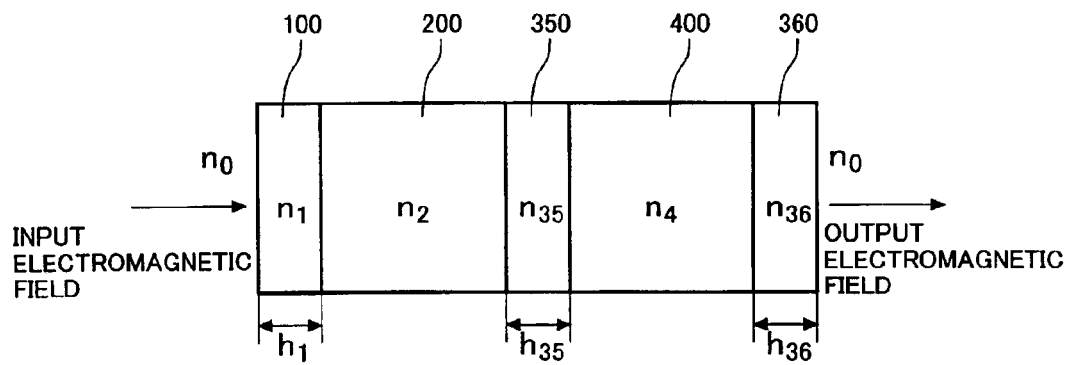
FIG. 3 is a diagram showing a group of photonic crystals which are connected in series and each of which has an antireflection layer of a second embodiment according to the invention.

By employing the present invention, the reflection can be reduced. FIG. 3 shows an embodiment of reducing the reflection. The photonic crystal device includes not only the photonic crystal 200 but also a photonic crystal 400. Since the photonic crystals 200 and 400 generally have propagation characteristics which are different from each other, their effective refractive indices are also different from each other.

When the photonic crystals 200 and 400 are directly connected to each other, therefore, reflection generally occurs at the interface. To reduce the reflection, it is sufficient to dispose a photonic crystal 350 between the photonic crystal 200 and the photonic crystal 400 having an effective refractive index $n_4$, and design so that the effective refractive index $n_{35}$ satisfies the equation $n_{35}^2 = n_2 n_4$ as much as possible and the length $h_{35}$ of the photonic crystal 350 satisfies $n_{35} h_{35} = (2m+1)\lambda_0/4$.

The outgoing side of the photonic crystal 400 is similar to the above. It is sufficient to dispose a photonic crystal 360 between the photonic crystal 400 and the medium 0 and design so that the effective refractive index $n_{36}$ satisfies the equation of $n_{36}^2 = n_0 n_4$ as much as possible and the length $h_{36}$ satisfies the equation of $n_{36} h_{36} = (2m+1)\lambda_0/4$.

Although the method of reducing the reflected wave in the case where two photonic crystal devices are connected in series has been described above in the embodiment, similarly, the reflected wave can be reduced also in the case where three or more photonic crystal devices are connected in series.

Third Embodiment

In the first embodiment, it has been described that a reflection loss can be reduced by disposing the photonic crystal 100 having the structure different from that of the photonic crystal 200. In practice, the photonic crystal 100 may employ various structures, and the optimum structure also depends on the structure of the photonic crystal 200.

Therefore, the structure and material of the photonic crystal 100 cannot be uniformly limited. In the third embodiment, an example of the antireflection layer for a line-defect waveguide of a two-dimensional photonic crystal will be described.

Figure 4A:
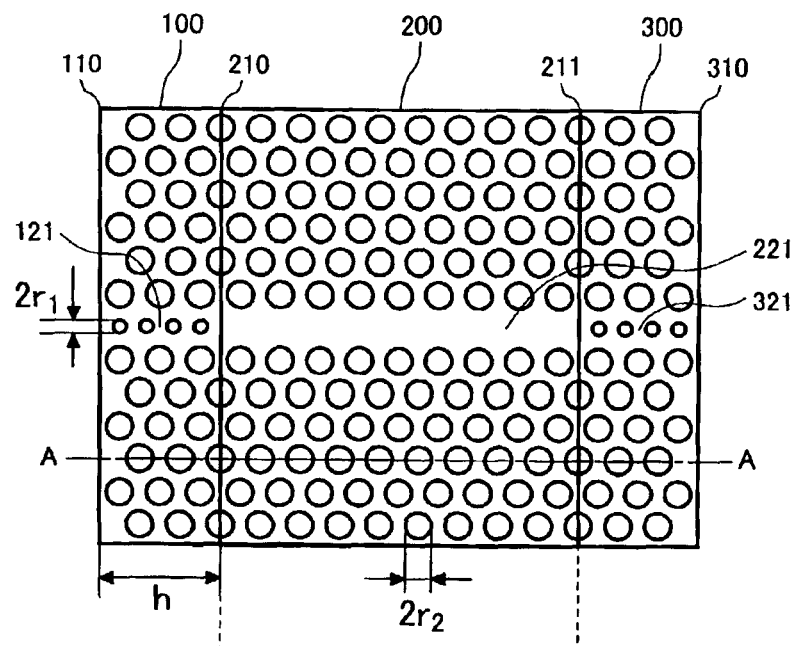
FIGS. 4A and 4B are diagrams showing a photonic crystal in which an antireflection layer is disposed in the photonic crystal including a line-defect waveguide of a third embodiment according to the invention.
Figure 4B:
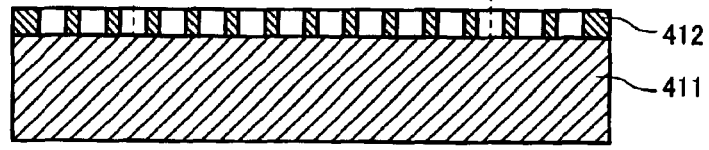

Although an example of a line-defect waveguide of a two-dimensional photonic crystal is described by M. Notomi et al., "Electronics Letters", Vol. 37, No. 5, pp. 293296 (2001), an action for reducing the reflection loss is not taken. FIGS. 4A and 4B show a structure for reducing the reflection loss for a line-defect waveguide of a two-dimensional photonic crystal. FIG. 4A is a top view and FIG. 4B is a cross section taken along line A—A.

In FIG. 4A, 221 shows a line-defect waveguide in the two-dimensional photonic crystal 200. As shown in FIG. 4B, the structure is constructed by a substrate 411 and a core layer 412 stacked on the substrate 411, for example, an $SiO_2$ substrate and an Si film stacked on the substrate. The photonic crystal structure is formed by opening holes in the Si film. In the case of considering propagation of light having a wavelength of 1.55 $\mu$m, the thickness of the Si film and the pitch of holes is about hundreds nm. Since the direction perpendicular to a line defect in the Si film is a direction with a periodic arrangement of holes, a band gap is formed and light of 1.55 $\mu$m cannot propagate. A periodic structure is not formed along a line defect, so that the light can be guided.

In order to reduce an incident loss of the two-dimensional photonic crystal line-defect waveguide, holes each having a radius $r_1$ are opened in the core layer on the line-defect waveguide in the region of the photonic crystal 100. The effective refractive index of a waveguide 121 in which the holes each having the radius $r_1$ are opened is lower than that of a waveguide 221 in the region 200, as the result of the holes opened. Consequently, the relation of $n_0 < n_1 < n_2$ can be satisfied. When the length $h_1$ of the region 100 is set so as to satisfy the equation $n_1 h_1 = (2m+1)\lambda_0/4$, an incident loss can be reduced. The radius $r_1$ is determined so as to satisfy the equation $n_1^2 = n_0 n_2$ as much as possible.

To set the effective refractive index $n_1$ to a desired value, a material with a refractive index lower than that of the core layer may be buried in the holes opened in the waveguide 121. In the embodiment, the core layer is made of Si with a refractive index of about 3.4 and examples of the material to be buried are $TiO_2$, $Ta_2O_5$, ZnS, and the like each having a refractive index of 2.0 to 2.3.

The incident side has been described above. With respect to the photonic crystal 300 on the outgoing side as well, it is sufficient to perform processes similar to those on the incident side.

In FIG. 4A, 210 denotes the interface between the photonic crystals 100 and 200 and 211 indicates the interface between the photonic crystals 200 and 300. The lines 210 and 211 do not always clearly exist physically but are lines provided for convenience of explanation. 110 denotes the interface between the photonic crystal 100 and an incident-side medium and 310 indicates the interface between the photonic crystal 300 and an outgoing-side medium.

Fourth Embodiment

Figure 5:
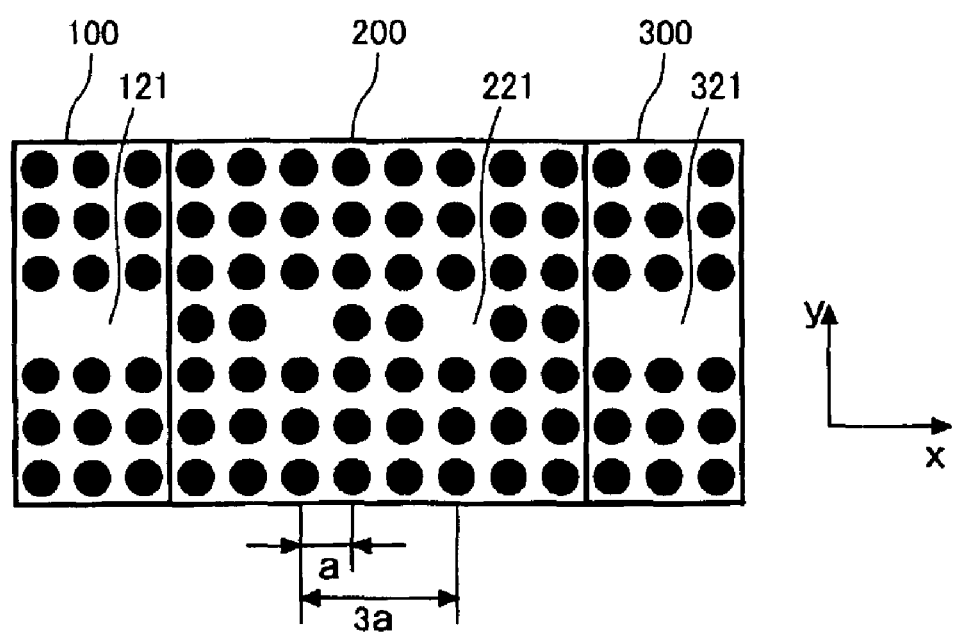
FIG. 5 is a diagram showing a photonic crystal in which an antireflection layer is disposed in the photonic crystal including a point-defect waveguide of a fourth embodiment according to the invention.

FIG. 5 shows an example of a two-dimensional photonic crystal in which the photonic crystal 200 has a point-defect waveguide.

In a fourth embodiment, for example, $SiO_2$ can be selected as the material of the substrate and $TiO_2$, $Ta_2O_5$, ZnS, or the like can be selected as the material of the core layer. The portion indicated by a painted circle (●) in FIG. 5 shows a state where a hole is opened in the core layer and moreover a material with a refractive index higher than that of the core layer is buried in the hole. In the case where Si with the refractive index of about 3.4 is selected for the core layer, GaAs or a polymer with a refractive index higher than that is used as a material to be buried. When a material with a refractive index of 2.0 to 2.3 such as $TiO_2$, $Ta_2O_5$, or ZnS is selected for the core layer, Si, GaAs, polymer, or the like is used as the material to be buried.

Figure 6:
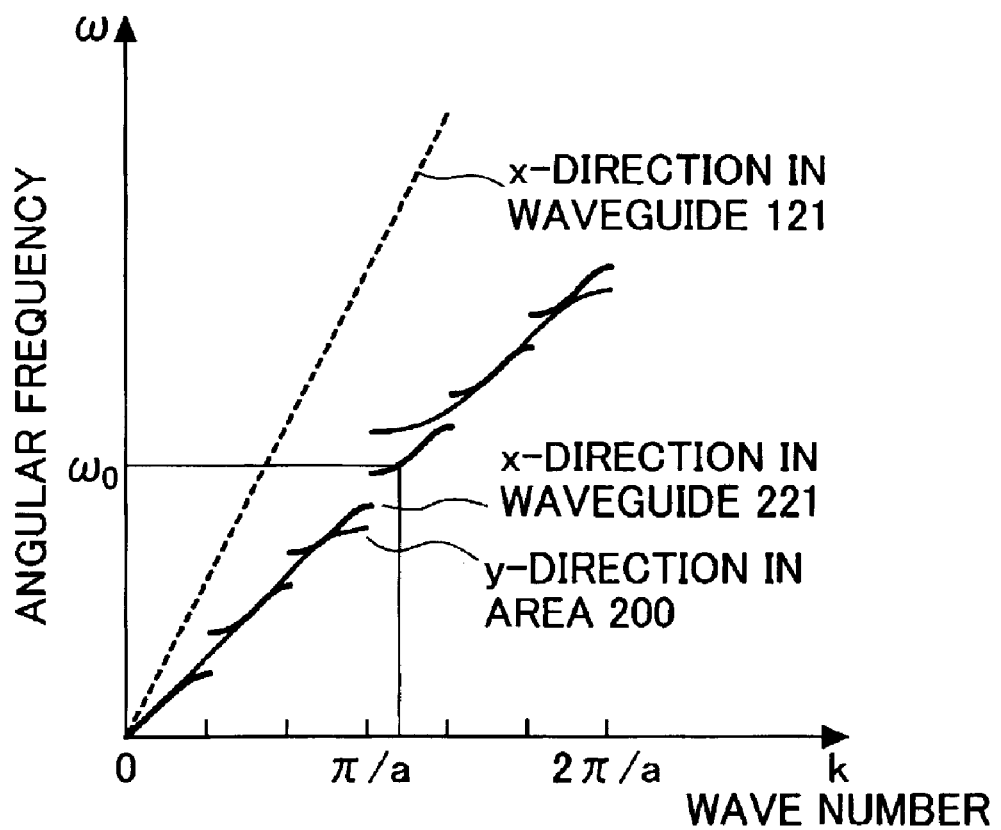
FIG. 6 is a diagram schematically showing characteristics of the photonic crystal of FIG. 5.

In the waveguide 221 of the photonic crystal 200, as shown in FIG. 5, a point defect where there is no painted circle (●) occur in a period $3a$ and waves can be guided through the point defect. The propagation characteristics are schematically shown by a dispersion relation of k (wave number) –ω (angular frequency) in FIG. 6. The characteristics in the x-direction (thick solid line) and the y-direction (thin solid line) are shown on the same axis.

In the y-direction, the period is "a". As a general property of the photonic crystal, a band gap appears at $k_y = n\pi/a$ (thin solid line in FIG. 6). In the x-direction, the period is $3a$, so that a band gap appears at $k_x = n\pi/3a$ (thick solid line in FIG. 6) where $n = \pm 1, \pm 2, \pm 3, \ldots$ As a result, a frequency area in which waves cannot propagate in the y-direction but can propagate in the x-direction exists at, for example, around the angular frequency $\omega_0$.

An area 100 is provided to an area 200 to reduce a loss of an incident wave, so that there is no material with a high refractive index indicated by painted circles in the waveguide portion 121. As a result, the effective refractive index in the x-direction of the waveguide portion 121 is lower than that in the x-direction of the waveguide portion 221 including the material with a high refractive index. The propagation characteristic in the x-direction of the waveguide portion 121 is schematically shown by a thick broken line in FIG. 6. By the above conditions, the relation of $n_0 < n_1 < n_2$ can be satisfied and an antireflection layer can be formed.

The incident side has been described above and the outgoing side may employ a similar structure.

Fifth Embodiment

Figure 7:
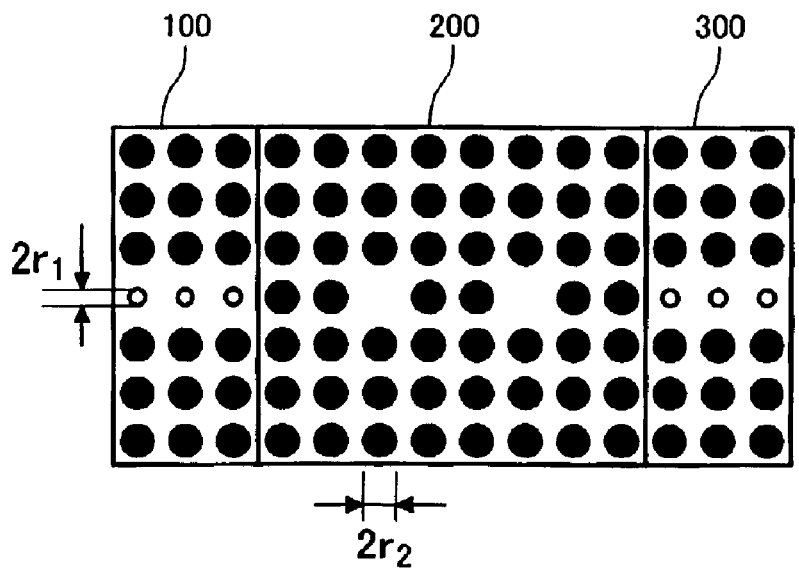
FIG. 7 is a diagram showing a photonic crystal in which an antireflection layer is disposed in the photonic crystal including a point-defect waveguide of a fifth embodiment according to the invention.

Since the optimum condition of minimizing the total reflectance is $n_1^2 = n_0 n_2$, the effective refractive index $n_1$ of the area 100 has to be adjusted. As shown in FIG. 7, the effective refractive index can be increased by opening holes each having a radius of $r_1$ in the waveguide portion of the area 100 in the core layer and burying a material with a refractive index higher than that of the core layer or can be decreased by opening the holes and burying nothing or a material with a low refractive index.

In the case where $TiO_2$ or ZnS is selected as the material of the core layer, Si or the like can be used as the material with a high refractive index and $Ta_2O_5$ or the like can be used as the material with a low refractive index. In the case where Si is selected as the material of the core layer, GaAs, a polymer, or the like can be used as the material with a high refractive index and $TiO_2$, $Ta_2O_5$, ZnS, or the like can be used as a material with a low refractive index.

The incident side has been described above and the outgoing side may employ a similar structure.

Sixth Embodiment

Figure 8:
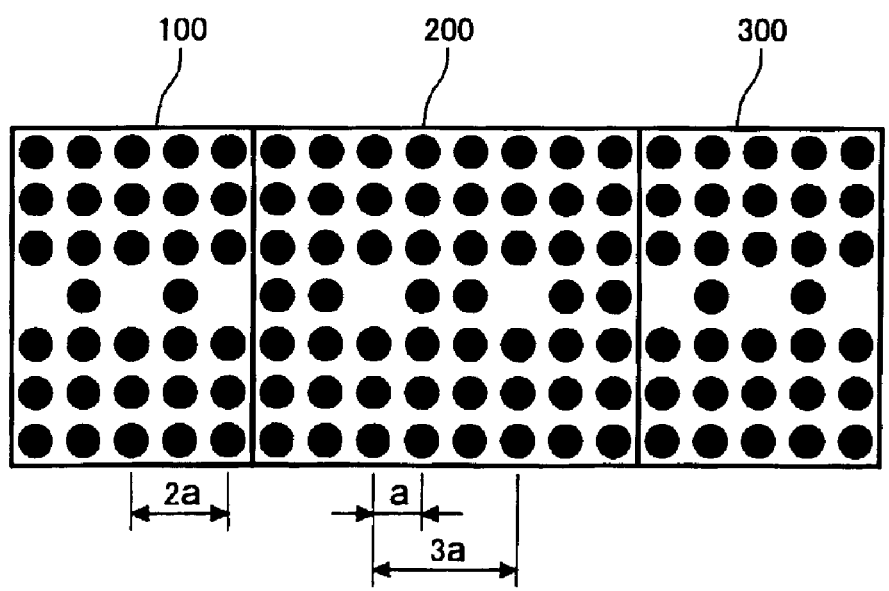
FIG. 8 is a diagram showing a photonic crystal in which an antireflection layer is disposed in the photonic crystal including a point-defect waveguide of a sixth embodiment according to the invention.

The area 100 disposed to reduce the reflection loss has to have an effective refractive index lower than that of the area 200 which is the main part of the photonic crystal device. It can be achieved by a method of setting the pitch of the periodic structure of the area 100 to be smaller than the pitch of the area 200. FIG. 8 shows an example of the case of a point-defect waveguide.

The period of the waveguide portion is 3a in the area 200 and is 2a in the area 100. In the area 100, as compared with the area 200, the proportion of the portion of a high refractive index (indicated by painted circles (●) is smaller. Consequently, the effective refractive index in the area 100 is lower than that in the area 200, and the condition for forming an antireflection layer is satisfied.

Seventh Embodiment

In the fourth embodiment, as the material to be buried for forming the periodic structure, a material with a refractive index higher than that of the core layer is used. It is also possible to use a material with a refractive index lower than that of the core material. For example, when $SiO_2$ having a refractive index of about 1.5 is used for the substrate and Si or the like having a refractive index of about 3.4 is used for the core material, $TiO_2$, $Ta_2O_5$, ZnS, or the like with a refractive index of 2.0 to 2.3 or $SiO_2$ can be used as the material to be buried. A method of just opening holes in the core layer in the portion of the material to be buried and burying nothing can be also employed.

Figure 9:
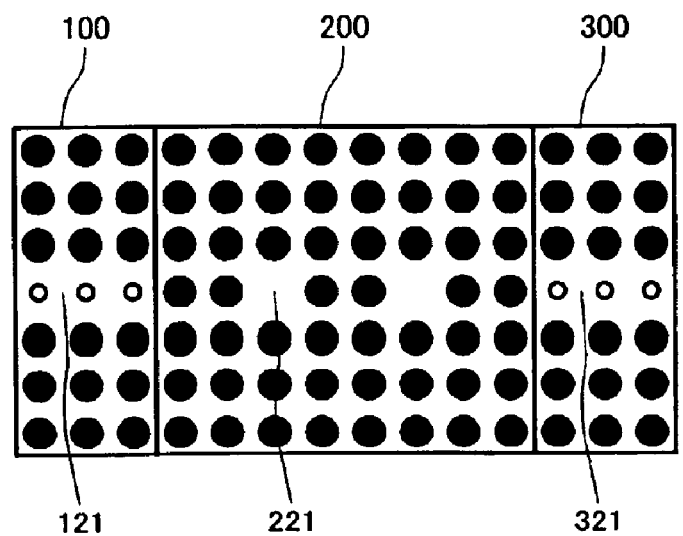
FIG. 9 is a diagram showing a photonic crystal in which an antireflection layer is disposed in the photonic crystal including a point-defect waveguide of a seventh embodiment according to the invention.

FIG. 9 schematically shows the seventh embodiment. In the diagram, portions of painted circles (●) indicate the buried material. In the waveguide 221, the portion indicated by the painted circles (●) is dropped and functions as a point defect waveguide. In the diagram, in portions each indicated by a blank circle (○) in waveguides 121 and 321 of the antireflection layers 100 and 300, a material with a refractive index lower than that of the material in the portion shown by the painted circle (●) is used to make the effective refractive index of the waveguides 121 and 321 lower than that of the waveguide 221. For example, Si is used as the material of the core layer, $TiO_2$ is used as the material of the portion indicated by the painted circle (●), and $Ta_2O_5$ is used as the material of the portion indicated by the blank circle (○).

Eighth Embodiment

Figure 10:
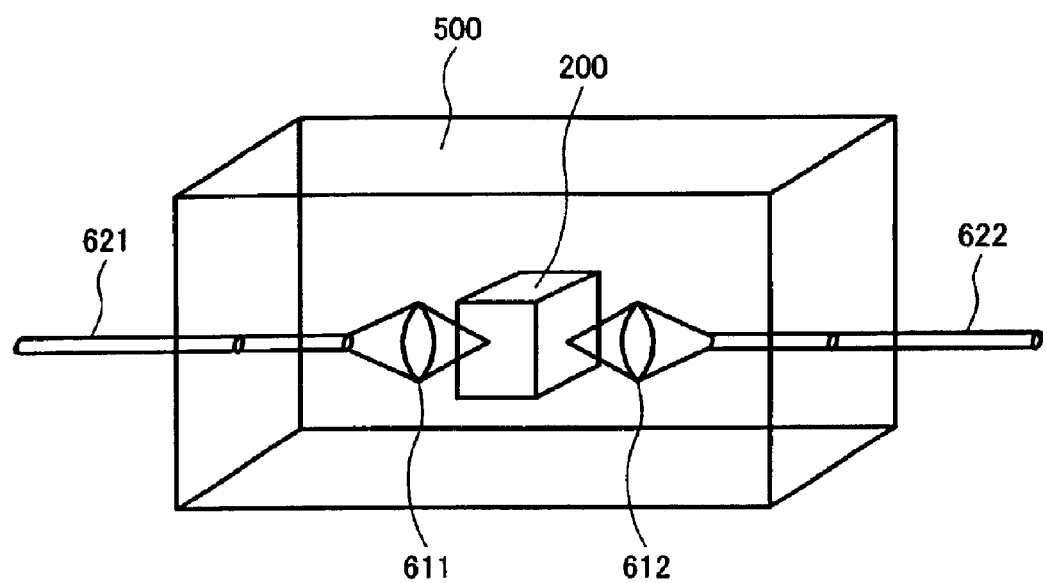
FIG. 10 is a diagram showing a configuration that a photonic crystal device of an eighth embodiment according to the invention is disposed in a container.

The photonic crystal has a micro structure and its greatest enemies are dusts. As shown in FIG. 10, by fixing an optical module including the photonic crystal device 200 according to the invention in a container 500 and sealing the container 500, the problem is solved.

As shown in FIG. 10, in the optical module installed in the container, incident light from an optical fiber 621 is converged by a lens 611 and converged light enters the photonic crystal device 200. Outgoing light from the photonic crystal 200 is guided to an optical fiber 622 by a lens 612. With such a structure, the problem of dusts and the like can be solved.

Ninth Embodiment

An effective refractive index to an electromagnetic field, of a photonic crystal is determined by the material and structure of the photonic crystal. Therefore, a desired refractive index can be obtained by designing as a principle. In the first to seventh embodiments, by using the principle, the antireflection layer made by the photonic crystal designed to have a desired refractive index is disposed in the photonic crystal device. The invention can be applied to a wider range, and a photonic crystal can be used as an antireflection layer of an arbitrary optical device.

Figure 11:
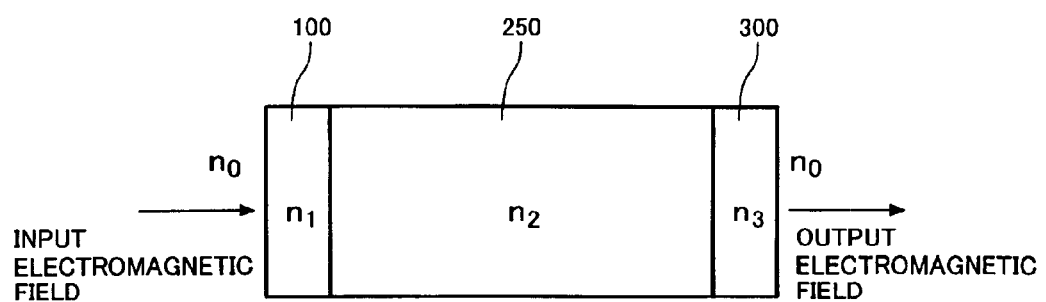
FIG. 11 is a diagram showing a medium having an antireflection layer made of a photonic crystal of a ninth embodiment according to the invention.

In FIG. 11, antireflection layers 100 and 300 made by photonic crystals are disposed in an arbitrary medium 250. The arrangement is basically similar to that of the first embodiment except that the medium 250 provided with the antireflection layer is not limited to a photonic crystal but is a general medium. As described in the first to seventh embodiments, the photonic crystals 100 and 300 can employ various structures.

Although the guideline for designing the antireflection layer has been described above by taking, as an example, the photonic crystal having holes in the two-dimensional slab waveguide, the method can be applied as it is to any other photonic crystals of a cylindrical shape, a three-dimensional woodpile shape, and the like.

According to the invention, the antireflection layer is constructed, by using the property that the propagation characteristics of the photonic crystal and the effective refractive index can be designed. Since the antireflection coating usually used employs a refractive index peculiar to the material, it is not so flexible. For reasons such that the photonic crystal has a characteristic structure or integrated, there is a case that a normal antireflection coating cannot be applied.

In the present invention, the antireflection layer is directly formed in the photonic crystal device body. Consequently, the antireflection layer can be formed even in the case where a device cannot be antireflection coated in a normal way. The antireflection layer is different from a conventionally known antireflection coating with respect to the above-described point and a point that the effective refractive index can be designed.

The present invention will be summarized as follows.

(1) In a photonic crystal medium through which an electromagnetic field propagates, an area of a photonic crystal whose structure is different from that of the main photonic crystal of the medium is disposed on an incident side or an outgoing side, and intensity of an outgoing wave from the photonic crystal medium is set to be higher than that in the case where the area does not exist.

(2) The photonic crystal medium of (1) is a one-dimensional, two-dimensional, or three-dimensional photonic crystal.

(3) The photonic crystal disposed in the incident or outgoing side of the photonic crystal medium of (1) is a one-dimensional, two-dimensional, or three-dimensional photonic crystal.

(4) The electromagnetic field which propagates through the photonic crystal medium of (1) is any one of light, ultraviolet rays, visible light, infrared light, millimeter wave, and microwave.

(5) In the photonic crystal medium of (1), the effective refractive index of the photonic crystal disposed on the incident or outgoing side with respect to the electromagnetic field to be guided is lower than the effective refractive index of the main photonic crystal of the medium.

(6) The photonic crystal medium of (1) includes a line-defect waveguide.

(7) The waveguide portion of the photonic crystal disposed on the incident or outgoing side of the photonic crystal medium of (6) has a structure that an empty part is formed or a material with a refractive index lower than that of a material of the waveguide is buried in the empty part.

(8) The photonic crystal medium of (1) includes a point-defect waveguide.

(9) A photonic crystal medium, wherein a waveguide portion of the photonic crystal disposed on the incident or outgoing side of the photonic crystal medium of (8) is a line-defect waveguide.

(10) A photonic crystal medium, wherein the waveguide portion of the photonic crystal disposed on the incident or outgoing side of the photonic crystal medium of (8) has a structure that an empty part is formed or a material with a refractive index different from that of a material of the waveguide is buried in the empty part.

(11) A photonic crystal medium, wherein the photonic crystal medium of (1) has a periodic structure and the period in the area on the incident or outgoing side is different from that of the main part of the medium.

(12) A photonic crystal medium, wherein the photonic crystal medium of (1) has a periodic structure and the size of the structure creating the periodicity in the area on the incident or outgoing side is different from that of the main part of the medium.

(13) A photonic crystal medium, wherein the photonic crystal medium of (1) has a periodic structure, and at least one of materials of the structure creating the periodicity in the area on the incident or outgoing side is different from that of the main part of the medium.

(14) A photonic crystal medium, wherein the periodic structure has a portion in which the periodicity is interrupted in the photonic crystal medium of (1).

(15) A photonic crystal medium, wherein the photonic crystal medium of (1) is fixed in a container.

(16) A medium through which an electromagnetic field propagates, wherein an area of a photonic crystal is disposed on the incident or outgoing side, and the intensity of an outgoing wave is set to be higher as compared with the case where the photonic crystal area is not provided.

(17) The medium wherein the photonic crystal disposed on the incident/outgoing side of the medium of (16) is a one-dimensional, two-dimensional, or three-dimensional photonic crystal.

(18) The medium wherein the electromagnetic field which propagates through the medium of (16) is any one of light, ultraviolet rays, visible light, infrared light, millimeter wave, and microwave.

(19) In the medium of (16), the effective refractive index of the photonic crystal disposed on the incident or outgoing side with respect to the electromagnetic field to be guided is lower than the effective refractive index of the main part of the medium.

(20) The photonic crystal medium, wherein the waveguide portion of the photonic crystal disposed on the incident or outgoing side of the medium of (16) has a structure that an empty part is formed or a material different from the material of the waveguide is buried in the empty part.

(21) The medium, wherein a waveguide portion of the photonic crystal disposed on the incident or outgoing side of the medium of (16) is a line-defect waveguide.

(22) A medium, wherein the medium of (16) is fixed in a container.

(23) An integrated device in which two or more photonic crystals are disposed in series, wherein another photonic crystal having a different structure is disposed between neighboring photonic crystals and intensity of an outgoing wave is higher as compared with the case where the extra photonic crystal is not disposed.

According to the invention, by disposing the antireflection layer made of the photonic crystal on the incident/outgoing side of the photonic crystal, the photonic crystal medium in which a reflection loss can be largely reduced can be realized.

What is claimed is:

1. A photonic crystal waveguide for propagating and guiding an electromagnetic field comprising:
    a photonic crystal medium having a main part, an incident side to receive an incident wave of the electromagnetic field, and an outgoing side to produce an outgoing wave of the electromagnetic field,
    wherein a photonic crystal of an area disposed on the incident side or the outgoing side of said photonic crystal medium has a structure, in which an antireflection layer is disposed therein, that is different from that of the main part of said photonic crystal medium so as to prevent the electromagnetic field from being reflected in an input plane and an output plane of said photonic crystal medium to reduce a reflection loss; and
    wherein the main part of said photonic crystal medium includes a point-defect waveguide, and the area disposed on the incident side or the outgoing side of said photonic crystal medium is a line-defect waveguide.

2. The photonic crystal waveguide according to claim 1, wherein an effective refractive index of the photonic crystal disposed on said incident side or outgoing side with respect to the electromagnetic field is lower than an effective refractive index of the photonic crystal disposed on the main part of said photonic crystal medium.

3. The photonic crystal waveguide according to claim 1, wherein said photonic crystal disposed on the incident side or outgoing side of said photonic crystal medium is a one-dimensional, two-dimensional, or three-dimensional photonic crystal.

4. The photonic crystal waveguide according to claim 3, wherein said photonic crystal disposed in the area on the incident side or the outgoing side of said photonic crystal medium has an effective refractive index different from that of said photonic crystal disposed in the main part of said photonic crystal medium.

5. The photonic crystal waveguide according to claim 1, wherein said photonic crystal disposed in the area on the incident side or the outgoing side of said photonic crystal medium has an effective refractive index lower than that of said photonic crystal disposed in the main part of said photonic crystal medium.

6. A photonic crystal waveguide for propagating and guiding an electromagnetic field comprising:

a photonic crystal medium having a main part, an incident side to receive an incident wave of the electromagnetic field, and an outgoing side to produce an outgoing wave of the electromagnetic field, wherein a photonic crystal of an area disposed on the incident side or the outgoing side of said photonic crystal medium has a structure, in which an antireflection layer is disposed therein, that is different from that of the main part of said photonic crystal medium so as to prevent the electromagnetic field from being reflected in an input plane and an output plane of said photonic crystal medium to reduce a reflection loss; and wherein said photonic crystal medium has a periodic structure and, in said area on the incident or outgoing side of said photonic crystal medium, the period of the structure creating periodicity is different from that of the main part of said photonic crystal medium.

7. The photonic crystal waveguide according to claim 6, wherein said photonic crystal medium and said photonic crystal disposed in said area on the incident side or the outgoing side of said photonic crystal medium are disposed in a container.

8. A photonic crystal medium for propagating an electromagnetic field, comprising:

a main part;

an input-side photonic crystal area disposed on an incident side of said main part; and an output-side photonic crystal area disposed on an outgoing side of said main part, wherein each of effective refractive indices $n_1$ of said input-side photonic crystal area and said output-side photonic crystal area is set to satisfy the relation of $n_0<n_1<n_2$ (where $n_0$ is an input-side refractive index outside said photonic crystal medium, and $n_2$ is a refractive index of said main part), and each of the effective length $h_1$ of said input-side photonic crystal area and said output-side photonic crystal area is set to satisfy the relation of $n_1h_1=(2m+1)\lambda_0/4$ (where $\lambda_0$ denotes a wavelength of the electromagnetic field in vacuum and m=0, 1, 2, . . . ), to thereby prevent the electromagnetic field from being reflected in input and output planes of said photonic crystal medium; and wherein each period of periodic structures of said input-side photonic crystal area and said output-side photonic crystal area is different from that of a periodic structure of said main part, or materials of said input-side photonic crystal area and said second output-side photonic crystal area are different in at least a portion from that of said main part, to thereby prevent the electromagnetic field from being reflected in the input and output planes of said photonic crystal medium.

9. A photonic crystal medium for propagating an electromagnetic field, comprising:

a main part;

an input-side photonic crystal area disposed on an incident side of said main part; and an output-side photonic crystal area disposed on an outgoing side of said main part, wherein each of effective refractive indices $n_1$ of said input-side photonic crystal area and said output-side photonic crystal area is set to satisfy the relation of $n_0<n_1<n_2$ (where $n_0$ is an input-side refractive index outside said photonic crystal medium, and $n_2$ is a refractive index of said main part), and each of the effective length $h_1$ of said input-side photonic crystal area and said output-side photonic crystal area is set to satisfy the relation of $n_1h_1=(2m+1)\lambda_0/4$ (where $\lambda_0$ denotes a wavelength of the electromagnetic field in vacuum and m=0, 1, 2, . . . ), to thereby prevent the electromagnetic field from being reflected in input and output planes of said photonic crystal medium; and wherein said photonic crystal medium includes a line-defect or a point-defect, and each of said input-side photonic crystal area and said output-side photonic crystal area has a defect structure different from said main part or a material buried in the defect, which is different from a material of said main part, to thereby prevent the electromagnetic field from being reflected in the input and output planes of said photonic crystal medium.

10. A photonic crystal device comprising:

a substrate having a main region, an inlet region and an outlet region at opposite ends of the main region;

at least one photonic crystal structure formed on a surface of the substrate, each photonic crystal comprising a plurality of spaced elements arranged on the substrate, extending from the inlet region to the outlet region, with a predetermined periodicity; and at least one waveguide defined by the arrangement of the plurality of spaced elements on the substrate, extending from the inlet region to the outlet region, for guiding an electromagnetic wave through the structure from the inlet region to the outlet region;

wherein each of effective refractive indices $n_1$ of said input-side photonic crystal area and said output-side photonic crystal area is set to satisfy the relation of $n_0<n_1<n_2$ (where $n_0$ is an input-side refractive index outside said photonic crystal medium, and $n_2$ is a refractive index of said main part), and each of the effective length $h_1$ of said input-side photonic crystal area and said output-side photonic crystal area is set to satisfy the relation of $n_1h_1=(2m+1)\lambda_0/4$ (where $\lambda_0$ denotes a wavelength of the electromagnetic field in vacuum and m=0, 1, 2, . . . ), to thereby prevent the electromagnetic field from being reflected in input and output planes of said photonic crystal medium; and wherein each period of said plurality of spaced elements arranged in the inlet region and the outlet region is different from that of said plurality of spaced elements arranged in the main region of the substrate.

11. The photonic crystal device according to claim 10, wherein said plurality of spaced elements arranged in the inlet region and the outlet region contain a material disposed therein that is different from that of the main region of the substrate.

12. The photonic crystal device according to claim 10, wherein said waveguide is a two-dimensional photonic crystal line-defect waveguide having a plurality of cylindrical holes formed in a core layer of the substrate, in which each of effective refractive indices of the two-dimensional photonic crystal line-defect waveguide in the inlet region and the outlet region having said cylindrical holes is lower than that of the two-dimensional photonic crystal line-defect waveguide in the main region.

13. A photonic crystal device comprising:

a substrate having a main region, an inlet region and an outlet region at opposite ends of the main region;

at least one photonic crystal structure formed on a surface of the substrate, each photonic crystal comprising a plurality of spaced elements arranged on the substrate, extending from the inlet region to the outlet region, with a predetermined periodicity; and at least one waveguide defined by the arrangement of the plurality of spaced elements on the substrate, extending from the inlet region to the outlet region, for guiding an electromagnetic wave through the structure from the inlet region to the outlet region:

wherein each of effective refractive indices $n_1$ of said input-side photonic crystal area and said output-side photonic crystal area is set to satisfy the relation of $n_0 < n_1 < n_2$ (where $n_0$ is an input-side refractive index outside said photonic crystal medium, and $n_2$ is a refractive index of said main part), and each of the effective length $h_1$ of said input-side photonic crystal area and said output-side photonic crystal area is set to satisfy the relation of $n_1 h_1 = (2m+1)\lambda_0/4$ (where $\lambda_0$ denotes a wavelength of the electromagnetic field in vacuum and m=0, 1, 2, . . . ), to thereby prevent the electromagnetic field from being reflected in input and output planes of said photonic crystal medium;

wherein said at least one waveguide is a two-dimensional photonic crystal line-defect waveguide having a plurality of cylindrical holes formed in a core layer of the substrate, in which each of effective refractive indices of the two-dimensional photonic crystal line-defect waveguide in the inlet region and the outlet region having said cylindrical holes is lower than that of the two-dimensional photonic crystal line-defect waveguide in the main region; and wherein said cylindrical holes formed in the inlet region of the two-dimensional photonic crystal line-defect waveguide include a material disposed therein with an effective refractive index higher than that of the core layer of the substrate.

* * * * *